(12) United States Patent
Kramer et al.

(10) Patent No.: US 10,301,422 B2
(45) Date of Patent: *May 28, 2019

(54) FAST-CURING COMPOSITION CONTAINING SILANE GROUPS

(71) Applicant: SIKA TECHNOLOGY AG, Baar (CH)

(72) Inventors: Andreas Kramer, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 112 days.

This patent is subject to a terminal disclaimer.

(21) Appl. No.: 15/519,307

(22) PCT Filed: Nov. 23, 2015

(86) PCT No.: PCT/EP2015/077377
§ 371 (c)(1),
(2) Date: Apr. 14, 2017

(87) PCT Pub. No.: WO2016/083312
PCT Pub. Date: Jun. 2, 2016

(65) Prior Publication Data
US 2017/0240688 A1    Aug. 24, 2017

(30) Foreign Application Priority Data

Nov. 24, 2014   (EP) ................................. 14194599

(51) Int. Cl.
| | |
|---|---|
| *C08G 18/83* | (2006.01) |
| *C08G 18/48* | (2006.01) |
| *C08G 18/71* | (2006.01) |
| *C08G 18/75* | (2006.01) |
| *C08G 18/10* | (2006.01) |
| *C08G 18/22* | (2006.01) |
| *C08G 65/336* | (2006.01) |
| *C09J 175/08* | (2006.01) |
| *C08L 71/02* | (2006.01) |
| *C08G 18/76* | (2006.01) |
| *C08L 75/08* | (2006.01) |
| *C09D 175/08* | (2006.01) |

(52) U.S. Cl.
CPC .......... *C08G 18/837* (2013.01); *C08G 18/10* (2013.01); *C08G 18/227* (2013.01); *C08G 18/4866* (2013.01); *C08G 18/718* (2013.01); *C08G 18/755* (2013.01); *C08G 18/7621* (2013.01); *C08G 65/336* (2013.01); *C08L 71/02* (2013.01); *C08L 75/08* (2013.01); *C09D 175/08* (2013.01); *C09J 175/08* (2013.01); *C08G 2190/00* (2013.01); *C08L 2205/025* (2013.01)

(58) Field of Classification Search
CPC .................................................... C08G 18/837
See application file for complete search history.

(56) References Cited

U.S. PATENT DOCUMENTS

| | | | |
|---|---|---|---|
| 9,790,315 B2* | 10/2017 | Kramer | ............... C08G 18/778 |
| 2011/0034627 A1* | 2/2011 | Boudet | ................. C08G 18/10 |
| | | | 524/588 |

FOREIGN PATENT DOCUMENTS

| | | |
|---|---|---|
| DE | 10 2008 020 979 A1 | 10/2009 |
| JP | 2011-052066 A | 3/2011 |

OTHER PUBLICATIONS

May 30, 2017 International Preliminary Report on Patentability issued in International Patent Application No. PCT/EP2015/077377.
Dec. 14, 2015 International Search Report issued in International Patent Application No. PCT/EP2015/077377.

* cited by examiner

*Primary Examiner* — Michael F Pepitone
(74) *Attorney, Agent, or Firm* — Oliff PLC

(57) ABSTRACT

A composition containing two different silane-functional polymers, only one of the two polymers having terminal groups of formula (I). The composition has a surprisingly rapid skin forming time and low viscosity, crosslinks quickly even without the use of EHS-critical catalysts such as organotin compounds or DBU, and cures to a non-sticky material with good strength and elasticity. Also relates to a method for accelerating the curing of a silane-crosslinking composition by adding to it a further silane-functional polymer having terminal groups of formula (I).

15 Claims, No Drawings

FAST-CURING COMPOSITION CONTAINING SILANE GROUPS

TECHNICAL FIELD

The invention relates to compositions containing silane groups and to the use thereof in moisture-curing adhesives, sealants or coatings for construction and industrial applications.

STATE OF THE ART

Polymers containing silane groups, also referred to as "silane-functional polymers" or "silane-modified polymers" (SMP) or "silane-terminated polymers" (STP), have been used successfully for some time as binders in moisture-curing compositions which find use especially as elastic adhesives, sealants or coatings in the construction and manufacturing industry, and constitute an isocyanate-free alternative to the traditional polyurethanes. Silane-functional polymers can be obtained in a very simple manner from polyurethane polymers, by converting the isocyanate group functionalities thereof to silane groups by means of amino- or hydroxysilanes. Such silane-functional polyurethanes crosslink relatively rapidly and cure to give nontacky materials of good strength and extensibility. With their high content of hydrogen bond-forming urethane and/or urea groups, however, they are of relatively high viscosity and therefore not always processible in a simple manner. Silane-functional polymers having lower viscosity that are free of urea groups and contain only few urethane groups, if any at all, are likewise known and are obtainable, for example, by reaction of polyether polyols with isocyanatosilanes or by hydrosilylation of allyl-functional polyethers. Such silane-functional polymers are popular because of their easy processibility and are therefore supplied commercially by many manufacturers. However, they are much slower to react, and hence crosslink slowly and remain tacky for a long time. Large amounts of highly active catalysts are often needed for sufficiently rapid and complete curing. Moreover, after curing, they usually do not attain the mechanical quality of the silane-functional polyurethane polymers obtained via amino- or hydroxysilanes.

Highly active catalysts that are conventionally used are organotin compounds. However, these are harmful to health and hazardous to the environment, and for those reasons their use is increasingly undesirable. As an alternative to organotin compounds, organotitanates are often used, but these have lower catalytic activity compared to organotin compounds, and for that reason they are used either in a very high dosage or in combination with strong bases, especially cyclic amidines such as 1,8-diazabicyclo[5.4.0]undec-7-ene (DBU). However, DBU is likewise a substance which is harmful to health and hazardous to the environment, and also odorous, and is additionally only of limited compatibility in compositions based on silane-functional polymers, such that they have a tendency to separation, sweating or substrate soiling.

There is therefore a need for a low-viscosity silane-functional polymer system with high crosslinking speed.

SUMMARY OF THE INVENTION

It is therefore an object of the present invention to provide a silane-functional polymer system which has a low viscosity and crosslinks rapidly even without the use of EHS-critical catalysts such as organotin compounds or DBU, and at the same time cures to give a nontacky material of good strength and extensibility.

It has been found that, surprisingly, this object is achieved by a composition of two different silane-functional polymers as claimed in claim 1. It is simple to produce, has good storability, has a low viscosity and cures surprisingly rapidly with moisture to give an elastic material having good strength, extensibility and thermal stability, even when the catalyst present is merely an organotitanate without an additional strong base.

What is especially surprising is the fact that the high reactivity of one polymer, even in the case of small proportions, is transmitted to the other, less reactive polymer and the composition, in spite of the silane groups of different reactivity in the two polymers in the curing, forms a material having good mechanical properties.

The invention further provides a method as claimed in claim 15. By this method, it is possible to greatly accelerate the curing of low-viscosity but comparatively non-reactive silane-functional polymers without the use of organotin compounds or strong bases such as DBU, and at the same time to increase the strength and elasticity thereof.

Further aspects of the invention are the subject of further independent claims. Particularly preferred embodiments of the invention are the subject of the dependent claims.

WAYS OF EXECUTING THE INVENTION

The invention provides a composition comprising
at least one silane-functional polymer P1; and
at least one silane-functional polymer P2 having end groups of the formula (I)

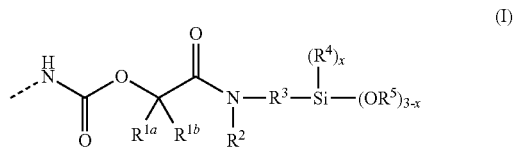

where
$R^{1a}$ and $R^{1b}$ are each independently a hydrogen atom or a monovalent hydrocarbyl radical having 1 to 12 carbon atoms, or together are an alkylene radical having 2 to 6 carbon atoms,
$R^2$ is a hydrogen atom or a monovalent hydrocarbyl radical which has 1 to 12 carbon atoms and optionally contains ether groups, ester groups, nitrile groups, amino groups or silane groups,
$R^3$ is a linear or branched alkylene or cycloalkylene radical having 1 to 20 carbon atoms, optionally having aromatic components, and optionally having one or more heteroatoms, especially nitrogen atoms,
$R^4$ is an alkyl radical having 1 to 8 carbon atoms,
$R^5$ is an alkyl radical which has 1 to 10 carbon atoms and optionally contains ether groups, and
x is 0, 1 or 2,
where the weight ratio between the silane-functional polymer P1 and the silane-functional polymer P2 is in the range from 99:1 to 10:90, and
where the silane-functional polymer P1 does not have any end groups of the formula (I).

In the present document, the term "alkoxysilane group" or "silane group" for short refers to a silyl group which is bonded to an organic radical and has 1 to 3, especially two or three, hydrolyzable alkoxy radicals on the silicon atom. A "methoxysilane group" refers to a silane group having exclusively methoxy radicals as alkoxy radicals. An "ethoxysilane group" refers to a silane group having exclusively ethoxy radicals as alkoxy radicals.

The term "alkoxysilane" or "silane" for short refers to an organic compound having at least one silane group.

"Hydroxysilane", "isocyanatosilane", "aminosilane" and "mercaptosilane" refer respectively to silanes having one or more hydroxyl, isocyanato, amino and mercapto groups on the organic radical in addition to the silane group. Substance names beginning with "poly", such as polyol or polyisocyanate, refer to substances which, in a formal sense, contain two or more functional groups that occur in their name per molecule.

The term "polyether containing silane groups" also encompasses organic polymers containing silane groups that, in addition to polyether units, may also contain urethane groups, urea groups or thiourethane groups. Such polyethers containing silane groups can also be referred to as "polyurethanes containing silane groups".

"Molecular weight" in the present document is understood to mean the molar mass (in grams per mole) of a molecule or part of a molecule, also referred to as "radical". "Average molecular weight" is understood to mean the number average $M_n$ of an oligomeric or polymeric mixture of molecules or radicals, which is typically determined by means of gel permeation chromatography (GPC) against polystyrene as standard.

"Storage-stable" or "storable" refers to a substance or composition when it can be stored at room temperature in a suitable container over a prolonged period, typically at least 3 months up to 6 months or more, without undergoing any change to a degree of relevance for its use in its application or use properties, especially in the viscosity and the crosslinking rate, as a result of the storage.

The term "viscosity" refers in the present document to the dynamic viscosity or shear viscosity which is defined by the ratio between the shear stress and the shear rate (speed gradient) and is determined as described in the working examples.

A dotted line in the formulae in this document in each case represents the bond between a substituent and the corresponding remainder of the molecule. "Room temperature" refers to a temperature of 23° C.

The silane-functional polymer P1 is preferably a polyolefin, a polyester, a polyamide, a poly(meth)acrylate or a polyether or a mixed form of these polymers. The silane groups thereof are not end groups of the formula (I). The silane groups thereof may be present in lateral chain positions or in terminal positions.

More preferably, the silane-functional polymer P1 is a polyolefin or a polyester or a poly(meth)acrylate or a polyether or a mixed form of these polymers.

Most preferably, the silane-functional polymer P1 is a polyether containing silane groups. It preferably has a majority of oxyalkylene units, especially 1,2-oxypropylene units. The silane groups are preferably dialkoxysilane groups and/or trialkoxysilane groups, especially dimethoxymethylsilane groups or trimethoxysilane groups or triethoxysilane groups.

The silane-functional polymer P1 is preferably free of isocyanate groups.

The silane-functional polymer P1 has an average of preferably 1.3 to 4, especially 1.5 to 3 and more preferably 1.7 to 2.8 silane groups per molecule. The silane-functional polymer P1 preferably has an average molecular weight in the range from 1000 to 30'000 g/mol, especially from 2000 to 20'000 g/mol.

The silane-functional polymer P1 is preferably liquid at room temperature. More preferably, it has a low viscosity. More particularly, the viscosity at 20° C. is in the range from 1 to 200 Pa·s, preferably 2 to 100 Pa·s, more preferably 5 to 50 Pa·s.

Preferably, the silane-functional polymer P1 is selected from the group consisting of polyethers containing silane groups that have been obtained from the reaction of polyethers containing allyl groups with hydrosilanes, optionally with chain extension, especially with diisocyanates;

polyethers containing silane groups that have been obtained from the copolymerization of alkylene oxides and epoxysilanes, optionally with chain extension, especially with diisocyanates;

polyethers containing silane groups that have been obtained from the reaction of polyether polyols with isocyanatosilanes, optionally with chain extension with diisocyanates; and polyethers containing silane groups that have been obtained from the reaction of urethane polyethers containing isocyanate groups with aminosilanes or hydroxysilanes or mercaptosilanes.

These silane-functional polymers P1 have particularly good obtainability.

Among these, preference is given to the polyethers containing silane groups that have been obtained from the reaction of polyethers containing allyl groups with hydrosilanes. These silane-functional polymers P1 are of particularly low viscosity and particularly low reactivity.

Among these, preference is further given to the polyethers containing silane groups that have been obtained from the reaction of polyether polyols with isocyanatosilanes. These silane-functional polymers P1 have particularly good obtainability, and are of very low viscosity and of comparatively low reactivity.

Additionally suitable are commercially available silane-functional polymers P1, especially products known by the trade names MS Polymer™ (from Kaneka Corp.; especially the products S203H, S303H, S227, S810, MA903 or S943); MS Polymer™ or Silyl™ (from Kaneka Corp.; especially the products SAT010, SAT030, SAT200, SAX350, SAX400, SAX725, MAX450, MAX602 or MAX951); Excestar® (from Asahi Glass Co. Ltd.; especially the products S2410, S2420, S3430 or S3630); SPUR+*(from Momentive Performance Materials; especially the products 1010LM, 1015LM or 1050MM); Vorasil™ (from Dow Chemical Co.; especially the products 602 or 604); Desmoseal® (from Bayer MaterialScience AG; especially the products S XP 2636, S XP 2749, S XP 2774 or S XP 2821); TEGOPAC® (from Evonik Industries AG; especially the products Seal 100, Bond 150 or Bond 250); or Geniosil® STP (from Wacker Chemie AG; especially the products E15 or E35).

Processes for preparing silane-functional polymers P1 are known to those skilled in the art.

In a first preferred process, a silane-functional polymer P1 is obtained from the reaction of polyethers containing allyl groups with hydrosilanes, optionally with chain extension with diisocyanates, for example. Such a silane-functional polymer P1 especially has end groups of the formula (IIa)

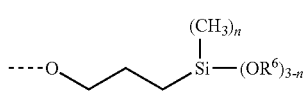

(IIa)

where
R$^6$ is a methyl radical or an ethyl radical and
n is 0 or 1 or 2.
Preferably, n is 0 or 1, especially 1, and R$^6$ is a methyl radical.

In a further preferred process, a silane-functional polymer P1 is obtained from the copolymerization of alkylene oxides and epoxysilanes, optionally with chain extension with diisocyanates, for example. Such a silane-functional polymer P1 especially has silane groups of the formula (IIb)

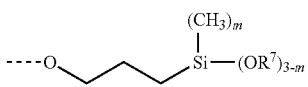

(IIb)

where
R$^7$ is a methyl radical or an ethyl radical and
m is 0 or 1 or 2.
Preferably, m is 0.

In a further preferred process, a silane-functional polymer P1 is obtained from the reaction of polyether polyols with isocyanatosilanes, optionally with chain extension with diisocyanates. Such a silane-functional polymer P1 especially has silane groups of the formula (IIc)

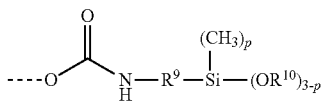

(IIc)

where
R$^9$ is an alkylene radical having 1 to 6 carbon atoms,
R$^{10}$ is a methyl radical or an ethyl radical and
p is 0 or 1 or 2.
Preferably, p is 0.
Preferably, R$^9$ is a 1,3-propylene radical.

In a further preferred process, a silane-functional polymer P1 is obtained from the reaction of polyethers containing isocyanate groups, especially NCO-terminated urethane polyethers from the reaction of polyether polyols with a superstoichiometric amount of polyisocyanates, or with aminosilanes, hydroxysilanes or mercaptosilanes. The same NCO-terminated urethane polyethers are suitable here as those described for the preparation of a silane-functional polymer P2 having end groups of the formula (I).

Such a silane-functional polymer P1 especially has end groups of the formula (IId)

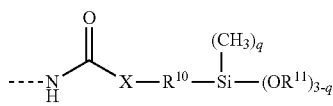

(IId)

where
X is O or S or NR$^{12}$ where R$^{12}$ is a hydrogen atom or a hydrocarbyl radical which has 1 to 20 carbon atoms and optionally has cyclic components and optionally has an alkoxysilyl group or one or more ether or carboxylic ester groups,
R$^{10}$ is a divalent hydrocarbyl radical which has 1 to 18 carbon atoms and optionally has cyclic and/or aromatic components and optionally has one or more heteroatoms,
R$^{11}$ is an alkyl radical which has 1 to 5 carbon atoms and optionally contains an ether group, and
q is 0 or 1 or 2,
where the end group of the formula (IId) is not an end group of the formula (I).
Preferably, q is 0.
Preferably, R$^{10}$ is 1,3-propylene or 1,4-butylene or 3,3-dimethyl-1,4-butylene and X is NR$^{12}$ where R$^{12}$ is preferably a radical of the formula

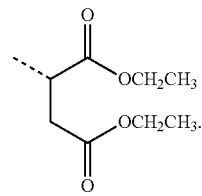

Further preferably, X is O and R$^{10}$ is a radical of the formula

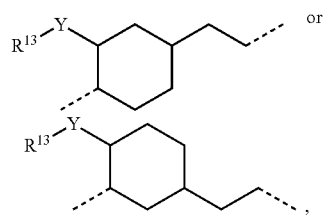

where this radical is in such a position that X is bonded directly to the cyclohexyl ring, and where Y is O or NR$^{14}$, and R$^{13}$ and R$^{14}$ are each independently a monovalent hydrocarbyl radical which has 1 to 18 carbon atoms and may contain heteroatoms in the form of ether oxygen or thioether sulfur or tertiary amine nitrogen, or together with Y (or N) form a ring, especially a morpholine ring.

The composition described further comprises at least one silane-functional polymer P2 having end groups of the formula (I).

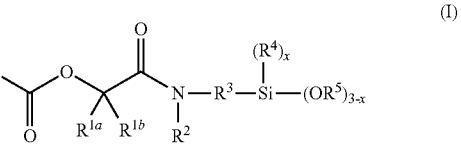

(I)

The silane-functional polymer P2 is preferably liquid at room temperature.

The silane-functional polymer P2 is preferably a polyether and/or polyester and/or polycarbonate containing silane groups.

More preferably, it is a polyether containing silane groups. It preferably has a majority of oxyalkylene units, especially 1,2-oxypropylene units.

The majority of its end groups of the formula (I) are bonded to cycloaliphatic or aromatic radicals, especially to cycloaliphatic radicals derived from isophorone diisocyanate. With end groups of the formula (I) bonded to cycloaliphatic radicals, it is particularly light-stable.

The silane-functional polymer P2 is preferably free of isocyanate groups.

The silane-functional polymer P2 preferably does not contain any further silane end groups aside from end groups of the formula (I).

The silane-functional polymer P2 has an average of preferably 1.3 to 4, especially 1.5 to 3 and more preferably 1.7 to 2.8 end groups of the formula (I) per molecule.

Preferably, the polymer P2 has a mean molecular weight in the range from 1'000 to 30'000 g/mol, preferably 2'000 to 25'000 g/mol, more preferably 3'000 to 20'000 g/mol.

$R^{1a}$ is preferably a hydrogen atom or a methyl radical, especially a methyl radical.

$R^{1b}$ is preferably a hydrogen atom or a methyl radical, especially a hydrogen atom.

More preferably, $R^{1a}$ is a methyl radical and $R^{1b}$ is a hydrogen atom. Such a polymer P2 has particularly good obtainability, particularly good preparability and particularly good mechanical properties.

$R^2$ is preferably a hydrogen atom.

$R^3$ is preferably a linear or branched alkylene radical having 1 to 6 carbon atoms.

More preferably, the $R^3$ radical is selected from the group consisting of methylene, 1,3-propylene, 2-methyl-1,3-propylene, 1,4-butylene, 3-methyl-1,4-butylene and 3,3-dimethyl-1,4-butylene. Among these, preference is given to 1,3-propylene or 3,3-dimethyl-1,4-butylene, especially 1,3-propylene.

The position of the substituents in the $R^3$ radicals is numbered starting from the silicon atom.

$R^4$ is preferably a methyl radical.

$R^5$ is preferably a methyl radical or an ethyl radical.

x is preferably 0 or 1, especially 0. Such a polymer has particularly reactive silane groups.

Most preferably, $R^{1a}$ is a methyl radical, $R^{1b}$ is a hydrogen atom, $R^2$ is a hydrogen atom, $R^3$ is a radical selected from the group consisting of 1,3-propylene, 2-methyl-1,3-propylene, 1,4-butylene, 3-methyl-1,4-butylene and 3,3-dimethyl-1,4-butylene, $R^5$ is a methyl radical or an ethyl radical, and x is 0.

The silane-functional polymer P2 having end groups of the formula (I) is preferably obtained from the reaction of polymers containing isocyanate groups, especially NCO-terminated urethane polyethers and/or urethane polyesters and/or urethane polycarbonates, from the reaction of polyols with a superstoichiometric amount of polyisocyanates, with at least one hydroxysilane of the formula (III)

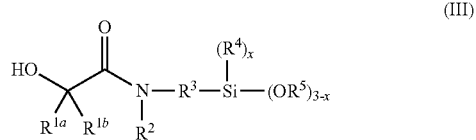

(III)

where $R^{1a}$, $R^{1b}$, $R^2$, $R^3$, $R^4$, $R^5$ and x have the definitions already given. A particularly preferred hydroxysilane of the formula (III) is N-(3-triethoxysilylpropyl)-2-hydroxypropanamide or N-(3-trimethoxysilylpropyl)-2-hydroxypropanamide.

Preference is given here to using the hydroxysilane of the formula (III) in a stoichiometric or slightly superstoichiometric amount relative to the isocyanate groups of the NCO-terminated urethane polyether, especially in a ratio in the range from 1.0 to 1.2.

The hydroxysilane of the formula (III) is preferably obtained from the reaction of at least one aminosilane of the formula (IV) with at least one lactide of the formula (V)

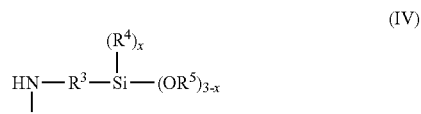

(IV)

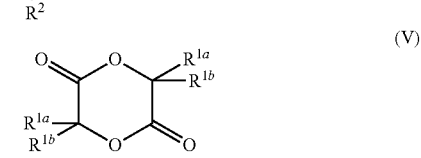

(V)

where $R^{1a}$, $R^{1b}$, $R^2$, $R^3$, $R^4$, $R^5$ and x have the definitions already given. This reaction is preferably conducted with exclusion of moisture at a temperature in the range from 15 to 120° C., especially 20 to 90° C., optionally in the presence of a catalyst and/or a desiccant such as, more particularly, vinyltriethoxysilane, tetraethoxysilane, vinyltrimethoxysilane or a molecular sieve. Preference is given to using about two moles of aminosilane per mole of lactide. More particularly, an aminosilane/lactide ratio in the range from 1.8 to 2.2 is employed. The reaction can be effected without solvent or in a suitable solvent. After the reaction, any volatile compounds present, especially solvents, unreacted reactants or alcohol released, can be removed from the reaction product by distillation.

A suitable NCO-terminated urethane polyether and/or urethane polyester and/or urethane polycarbonate is especially obtained from the reaction of polyols with a superstoichiometric amount of polyisocyanates, especially diisocyanates. The reaction is preferably conducted with exclusion of moisture at a temperature of 50° C. to 160° C., optionally in the presence of suitable catalysts, with the metered addition of the polyisocyanate in such a way that the isocyanate groups thereof are present in a stoichiometric excess in relation to the hydroxyl groups of the polyol. More particularly, the excess of polyisocyanate is chosen so as to leave, in the resulting urethane polyether after the conversion of all hydroxyl groups, a content of free isocyanate groups of 0.1% to 5% by weight, preferably 0.2% to 4% by weight, more preferably 0.3% to 3% by weight, based on the overall polymer. Optionally, the urethane polymer can be prepared with additional use of plasticizers, in which case the plasticizers used do not contain any groups reactive toward isocyanates. Preferred polyisocyanates are diisocyanates, especially diisocyanates selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI), and diphenylmethane 4,4'-, 2,4'- and 2,2'-diisocyanate and any desired mixtures of these isomers (MDI). Particular preference is given to IPDI or TDI. Most preferred is IPDI. In this way, silane-functional polymers having particularly good lightfastness are obtained.

Preferred polyols are polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having a plurality of OH or NH groups, for example ethane-1,2-diol, propane-1,2- and -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- and -1,4-dimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those comprising styrene-acrylonitrile particles (SAN) or acrylonitrile-methyl methacrylate particles.

Polyester polyols, especially from the polycondensation of hydroxycarboxylic acids or especially those which are prepared from di- to trihydric, especially dihydric, alcohols, for example ethylene glycol, diethylene glycol, propylene glycol, dipropylene glycol, neopentyl glycol, butane-1,4-diol, pentane-1,5-diol, 3-methylhexane-1,5-diol, hexane-1,6-diol, octane-1,8-diol, decane-1,10-diol, dodecane-1,12-diol, 1,12-hydroxystearyl alcohol, cyclohexane-1,4-dimethanol, dimer fatty acid diol (dimer diol), neopentyl glycol hydroxypivalate, glycerol or 1,1,1-trimethylolpropane or mixtures of the aforementioned alcohols, with organic di- or tricarboxylic acids, especially dicarboxylic acids, or the anhydrides or esters thereof, such as, more particularly, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid or trimellitic anhydride, or mixtures of the aforementioned acids, and also polyester polyols formed from lactones such as, more particularly, ε-caprolactone, and starters such as the aforementioned di- or trihydric alcohols. Particularly suitable polyester polyols are polyester diols.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Particularly preferred polyols are polyether polyols, especially polyoxypropylenediols and/or polyoxypropylenetriols, or what are called ethylene oxide-terminated (EO-endcapped) polyoxypropylenediols or polyoxypropylenetriols. The latter are polyoxyethylene-polyoxypropylene copolyols, which are especially obtained by further alkoxylating polyoxypropylenediols or polyoxypropylenetriols with ethylene oxide on conclusion of the polypropoxylation reaction, as a result of which they ultimately have primary hydroxyl groups.

Preferred polyether polyols have a degree of unsaturation of less than 0.02 meq/g, especially less than 0.01 meq/g.

Preferred polyether polyols have an average molecular weight in the range from 500 to 30'000 g/mol, preferably 1'000 to 20'000 g/mol, especially 2'000 to 15'000 g/mol.

For preparation of a suitable NCO-terminated urethane polyether, as well as polyether polyols, it is also possible to use proportions of other polyols, especially polyacrylate polyols or low molecular weight diols or triols.

The silane-functional polymer P2 having end groups of the formula (I) has advantageous properties. It is of moderate viscosity and very storage-stable, and cures rapidly with moisture at room temperature to give elastic, nontacky material having high strength, high extensibility and very good thermal stability.

The silane-functional polymer P1 and the silane-functional polymer P2 having end groups of the formula (I) are typically prepared separately from one another. Subsequently, the two polymers and any further constituents are mixed by a suitable method, giving rise to a composition of the invention.

In one embodiment of the invention, the polymer P2 having end groups of the formula (I) is prepared in the presence of a silane-functional polymer P1 that has already been prepared beforehand. The procedure here may especially be that (i) the silane-functional polymer P1 is initially charged, (ii) the aminosilane of the formula (IV) and the lactide of the formula (V) are mixed into the polymer P1 and reacted as previously described, giving rise to a hydroxysilane of the formula (III), and finally (iii) an NCO-terminated urethane polyether is mixed into the reaction mixture and reacted with the hydroxysilane as described, giving rise to a composition of the invention.

In the composition, the polymer P1 and the polymer P2 are present in such an amount that the weight ratio between the silane-functional polymers P1 and P2 is in the range from 99:1 to 10:90.

Preferably, the weight ratio between the silane-functional polymers P1 and P2 is in the range from 98:2 to 20:80, especially 95:5 to 25:75, more preferably 90:10 to 30:70. Such a composition has an optimal combination of low viscosity and rapid curing.

Both the silane-functional polymer P1 and the silane-functional polymer P2 have silane groups. Both polymers are storage-stable with exclusion of moisture. On contact with moisture, the silane groups are hydrolyzed. This forms silanol groups (Si—OH groups), and subsequent condensation reactions form siloxane groups (Si—O—Si groups). As a result of these reactions, the composition cures to give a crosslinked plastic. The water for the curing can either come from the air (air humidity), or the composition can be contacted with a water-containing component, for example by spreading, spraying or mixing-in.

Preferably, the two silane-functional polymers contain silane groups with the same alkoxy radicals. As a result, the curing of the composition releases just one kind of alcohol. Such a composition has particularly good storage stability. In the case of compositions having silane groups of different alkoxy radicals, it is possible for the silane groups to exchange alkoxy radicals with one another by transesterification during storage, which can result in a significant change in the curing speed of the composition, and this is undesirable.

Preferably, the silane-functional polymer P1 and the silane-functional polymer P2 in the composition both have either exclusively methoxysilane groups or exclusively ethoxysilane groups.

Compositions having exclusively methoxysilane groups have the advantage of crosslinking particularly rapidly with moisture.

Compositions having exclusively ethoxysilane groups have the advantage of being particularly storage-stable, and of releasing ethanol, which is less toxic, in the course of curing.

The composition preferably comprises, as well as the silane-functional polymer P1 and the silane-functional polymer P2, at least one further constituent selected from fillers, crosslinkers, plasticizers, solvents, catalysts, adhesion promoters, desiccants, stabilizers, pigments and rheology aids. Such a composition can especially be used as an elastic adhesive or sealant or elastic coating.

Preferably, such a composition has a content of silane-functional polymers in the range from 5% to 95% by weight, especially in the range from 20% to 80% by weight.

Preferably, the composition comprises at least one catalyst that accelerates the crosslinking of silane-functional polymers. Especially suitable for the purpose are metal catalysts and/or nitrogen compounds.

Suitable metal catalysts are especially compounds of titanium, zirconium, aluminum or tin, especially organotin compounds, organotitanates, organozirconates or organoaluminates, where these compounds especially have alkoxy groups, aminoalkoxy groups, sulfonate groups, carboxyl groups, 1,3-diketonate groups, 1,3-ketoesterate groups, dialkylphosphate groups and dialkylpyrophosphate groups.

Particularly suitable organotin compounds are dialkyltin oxides, dialkyltin dichlorides, dialkyltin dicarboxylates and dialkyltin diketonates, especially dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate and dioctyltin diacetylacetonate, or alkyltinthioesters.

Particularly suitable organotitanates are:
- titanium(IV) complexes having two 1,3-diketonate ligands, especially 2,4-pentanedionate (=acetylacetonate), and two alkoxide ligands;
- titanium(IV) complexes having two 1,3-ketoesterate ligands, especially ethylacetoacetate, and two alkoxide ligands;
- titanium(IV) complexes having one or more aminoalkoxide ligands, especially triethanolamine or 2-((2-aminoethyl)amino)ethanol, and one or more alkoxide ligands;
- titanium(IV) complexes having four alkoxide ligands;
- and more highly condensed organotitanates, especially oligomeric titanium(IV) tetrabutoxide, also referred to as polybutyl titanate;

where suitable alkoxide ligands are especially isobutoxy, n-butoxy, isopropoxy, ethoxy and 2-ethylhexoxy.

Very particularly suitable are bis(ethylacetoacetato)diisobutoxytitanium(IV), bis(ethylacetoacetato)diisopropoxytitanium(IV), bis(acetylacetonato)diisopropoxytitanium(IV), bis(acetylacetonato)diisobutoxytitanium(IV), tris(oxyethyl)amineisopropoxytitanium(IV), bis[tris(oxyethyl)amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxydiethoxytitanium(IV), titanium(IV) tetrabutoxide, tetra(2-ethylhexyloxy)titanate, tetra(isopropoxy)titanate or polybutyl titanate. Especially suitable are the following commercially available products: Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the following commercially available products: Ken-React® NZ® 38J, KZ® TPPJ, KZ® TPP, NZ® 01, 09, 12 38, 44 or 97 (all from Kenrich Petrochemicals) or Snapcure® 3020, 3030, 1020 (all from Johnson Matthey & Brandenberger).

A particularly suitable organoaluminate is the commercially available product K-Kat 5218 (from King Industries).

Nitrogen compounds suitable as catalyst are especially amines such as, more particularly, N-ethyldiisopropylamine, N,N,N',N'-tetramethylalkylenediamines, polyoxyalkyleneamines, 1,4-diazabicyclo[2.2.2]octane; aminosilanes such as, more particularly, 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)-propyl]ethylenediamine or the analogs thereof having ethoxy or isopropoxy in place of the methoxy groups on the silicon; cyclic amidines such as, more particularly, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, more particularly, tetramethylguanidine, 2-guanidinobenzimidazole, acetylacetoneguanidine, 1,3-di-o-tolylguanidine, 2-tert-butyl-1,1,3,3-tetramethylguanidine; or reaction products of carbodiimides and amines, such as, more particularly, polyetheramines or aminosilanes; or imidazoles such as, more particularly, N-(3-trimethoxysilylpropyl)-4,5-dihydroimidazole and N-(3-triethoxysilylpropyl)-4,5-dihydroimidazole.

Also suitable are combinations of various catalysts, especially combinations of at least one metal catalyst and at least one nitrogen compound. Preferred catalysts are organotin compounds, organotitanates, amines, amidines, guanidines and imidazoles.

Particular preference is given to organotitanates and guanidines.

Additionally suitable are especially the following auxiliaries and additives:
- inorganic and organic fillers, especially natural, ground or precipitated calcium carbonates optionally coated with fatty acids, especially stearic acid, baryte (heavy spar), talcs, quartz flours, quartz sand, dolomites, wollastonites, kaolins, calcined kaolins, mica, molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow beads.
- adhesion promoters and/or crosslinkers, especially silanes such as, more particularly, aminosilanes such as, more particularly 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)-propyl] ethylenediamine and the analogs thereof having ethoxy or isopropoxy in place of the methoxy groups on the silicon, N-phenyl-, N-cyclohexyl- or N-alkylaminosilanes, and also mercaptosilanes, epoxysilanes, (meth)acryloylsilanes, anhydridosilanes, carbamatosilanes, alkylsilanes or iminosilanes, or oligomeric forms of these silanes, or adducts formed from primary aminosilanes with epoxysilanes or (meth)acryloylsilanes or anhydridosilanes. Especially suitable are 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl] ethylenediamine, 3-mercaptopropyltrimethoxysilane, 3-ureidopropyltrimethoxysilane and the corresponding silanes having ethoxy groups in place of the methoxy groups, or oligomeric forms of these silanes.

plasticizers, especially carboxylic esters such as phthalates, especially dioctyl phthalate, diisononyl phthalate or diisodecyl phthalate, adipates, especially dioctyl adipate, azelates, sebacates, polyols, especially polyoxyalkylenepolyols or polyesterpolyols, glycol ethers, glycol esters, organic phosphoric or sulfonic esters, polybutenes, or fatty acid methyl or ethyl esters derived from natural fats or oils, also called "biodiesel".

solvents.

desiccants, especially tetraethoxysilane, vinyltrimethoxy- or vinyltriethoxysilane and organoalkoxysilanes having a functional group in the α position to the silane group, especially N-(methyldimethoxysilylmethyl)-O-methylcarbamate, (methacryloyloxymethyl)silanes, methoxymethylsilanes, orthoformic esters, or calcium oxide or molecular sieves.

stabilizers against oxidation, heat, light or UV radiation.

pigments, especially titanium dioxide or iron oxides.

rheology modifiers, especially thickeners, especially sheet silicates such as bentonites, derivatives of castor oil, hydrogenated castor oil, polyamides, polyurethanes, urea compounds, fumed silicas, cellulose ethers or hydrophobically modified polyoxyethylenes.

fibers, especially glass fibers, carbon fibers, metal fibers, ceramic fibers or polymer fibers such as polyamide fibers or polyethylene fibers.

dyes.

natural resins, fats or oils such as rosin, shellac, linseed oil, castor oil or soya oil.

nonreactive polymers such as, more particularly, homo- or copolymers of unsaturated monomers, especially from the group comprising ethylene, propylene, butylene, isobutylene, isoprene, vinyl acetate and alkyl (meth) acrylates, especially polyethylenes (PE), polypropylenes (PP), polyisobutylenes, ethylene-vinyl acetate copolymers (EVA) or atactic poly-α-olefins (APAO).

flame-retardant substances, especially the aluminum hydroxide and magnesium hydroxide fillers already mentioned, or especially organic phosphoric esters such as, more particularly, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis- and tris(isopropylphenyl) phosphate of different isopropylation levels, resorcinolbis(diphenyl phosphate), bisphenol A bis(diphenyl phosphate) or ammonium polyphosphates.

surface-active substances, especially wetting agents, leveling agents, deaerators or defoamers.

biocides, especially algicides, fungicides or substances that inhibit fungal growth.

or further substances customarily used in moisture-curing compositions.

It may be advisable to chemically or physically dry certain constituents before mixing them into the composition.

In a preferred embodiment, the composition is free of heavy metal-containing organic compounds. More particularly, it is free of organotin compounds.

In a further preferred embodiment, the composition is free of cyclic amidines, especially free of 1,8-diazabicyclo[5.4.0] undec-7-ene (DBU).

The composition is preferably produced and stored with exclusion of moisture. Typically, the composition is storage-stable with exclusion of moisture in a suitable package or arrangement, such as, more particularly, a drum, a pouch or a cartridge.

The composition may take the form of a one-component composition or of a two-component composition.

A "one-component" composition in the present document refers to a composition in which all the constituents of the composition are stored in a mixture in the same container and which is curable with moisture.

A "two-component" composition in the present document refers to a composition in which the constituents of the composition are present in two different components which are stored in separate containers. Only shortly before or during the application of the composition are the two components mixed with one another, and then the mixed composition cures, with the curing only proceeding or being completed through the action of moisture.

On application of the composition to at least one solid body or article, the silane groups present and any further moisture-reactive groups present come into contact with moisture, which results in curing of the composition. The curing proceeds at different speed according to the temperature, the nature of the contact, the amount of moisture and the presence of any catalysts. In the case of curing by means of air humidity, a skin is at first formed on the surface of the composition. What is called the skin time is a measure of the curing rate.

The invention thus further provides a cured composition obtained from a composition as described after it has reacted with moisture.

The composition, in the cured state, has markedly elastic properties, especially high strength and high extensibility, and also good thermal stability and good adhesion properties on various substrates. As a result, it is suitable for a multitude of uses, especially as a fiber composite material (composite), potting compound, sealant, adhesive, covering, coating or paint for construction and industrial applications, for example as an electrical insulation compound, spackling compound, joint sealant, weld or flange seam sealant, parquet adhesive, assembly adhesive, bodywork adhesive, glazing adhesive, sandwich element adhesive, floor covering, floor coating, balcony coating, roof coating, concrete protection coating, parking garage coating, or as anticorrosion paint, as seal, paint, varnish and primer.

The composition is particularly suitable as an adhesive or sealant or coating, especially for joint sealing or for elastic adhesive bonds in construction or industrial applications.

The invention further provides for the use of the composition described as an adhesive or sealant or as a coating.

For use as an adhesive or sealant, the composition preferably has a pasty consistency with structurally viscous properties. Such a pasty adhesive or sealant is especially applied to a substrate from commercial cartridges which are operated manually or by means of compressed air, or from a drum or vat by means of a conveying pump or an extruder, optionally by means of an application robot.

It is possible for two identical or two different substrates to be bonded or sealed.

Suitable substrates are especially
- glass, glass ceramic, screen-printed ceramic, concrete, mortar, brick, tile, gypsum or natural stone such as granite or marble;
- metals and alloys such as aluminum, iron, steel and nonferrous metals, or surface-finished metals and alloys such as galvanized or chromed metals;
- leather, textiles, paper, wood, wood-based materials bonded with resins, for example phenolic, melamine or epoxy resins, resin-textile composites or further polymer composites;
- plastics, especially rigid or flexible PVC, ABS, polycarbonate (PC), polyamide (PA), polyester, PMMA, epoxy resins, PUR, POM, PO, PE, PP, EPM or EPDM, optionally with surface treatment of the plastics by means of plasma, corona or flames;
- fiber-reinforced plastics, such as carbon fiber-reinforced plastics (CFP), glass fiber-reinforced plastics (GFP) or sheet molding compounds (SMC);
- coated substrates, such as powder-coated metals or alloys;
- paints or lacquers, especially automotive topcoats.

The substrates can be pretreated if required prior to the application of the adhesive or sealant, especially by physical and/or chemical cleaning methods or the application of an adhesion promoter, an adhesion promoter solution or a primer.

After the bonding or sealing of two substrates, a bonded or sealed article is obtained. Such an article may be a built structure, especially a built structure in construction or civil engineering, or it may be an industrial good or a consumer good, especially a window, a domestic appliance, or a means of transport such as, more particularly, an automobile, a bus, a truck, a rail vehicle, a ship, an aircraft or a helicopter, or an installable component thereof.

The invention further relates to a method of accelerating the curing of a moisture-curing composition comprising at least one silane-functional polymer P1, by adding to the composition at least one silane-functional polymer P2 having end groups of the formula (I), wherein the silane-functional polymer P1 does not have any end groups of the formula (I).

Suitable silane-functional polymers P1 and P2 here are those previously described, especially the preferred embodiments thereof. By this method, it is possible to greatly accelerate the curing of low-viscosity but comparatively non-reactive silane-functional polymers, for example commercially available products having the trade names MS Polymer™, TEGOPAC® or SPUR⁺, without the use of organotin compounds or strong bases such as DBU, and at the same time to increase the strength and elasticity thereof. In this way, moisture-curing compositions with surprisingly fast skin time and low viscosity are obtainable, which brings the advantages already mentioned. Even with small added amounts of polymer P2, compositions having virtually just as fast a skin time as with polymer P2 alone are obtained.

Preferably, the silane-functional polymer P2 is added in such an amount that the weight ratio between the silane-functional polymers P1 and P2 is in the range from 99:1 to 10:90, preferably 95:5 to 20:80, more preferably 90:10 to 30:70, especially 80:20 to 40:60.

The moisture-curing composition preferably comprises at least one further constituent selected from fillers, crosslinkers, plasticizers, solvents, catalysts, adhesion promoters, desiccants, stabilizers, pigments and rheology aids, as previously described.

After the addition of the silane-functional polymer P2, such a moisture-curing composition preferably has a content of silane-functional polymers in the range from 5% to 95% by weight, especially in the range from 20% to 80% by weight.

EXAMPLES

Detailed hereinafter are working examples which are intended to illustrate the invention described in detail. Of course, the invention is not restricted to these described working examples.

"Standard climatic conditions" are understood to mean a temperature of 23±1° C. and a relative air humidity of 50±5%. "SCC" stands for "standard climatic conditions".

"TFT" stands for "tack-free time".

Viscosities were determined on a Rheotec RC30 thermostatted cone-plate viscometer (cone diameter 50 mm, cone angle 1°, cone tip-plate distance 0.05 mm, shear rate 10 s$^{-1}$) at 20° C.

The compositions identified by "(Ref.)" in tables 1 to 4 are comparative examples.

1. Starting Materials Used and Abbreviations Therefor:

| | |
|---|---|
| Acclaim® 12200 | polyoxypropylenediol with a low level of unsaturation, OH number 11.0 mg KOH/g, water content about 0.02% by weight (from Bayer) |
| IPDI | isophorone diisocyanate, Vestanat® IPDI (from Evonik Industries) |
| TDI | tolylene 2,4-diisocyanate, Desmodur® T-100 (from Bayer MaterialScience) |
| DIDP | diisodecyl phthalate |
| IBAY | bis(ethylacetoacetato)diisobutoxytitanium(IV), Tyzor® IBAY (from Dorf Ketal) |
| VTEO | vinyltriethoxysilane |
| VTMO | vinyltrimethoxysilane |
| PCC | precipitated calcium carbonate, Socal® U1 S2 (from Solvay) |
| GCC | ground calcium carbonate, Omyacarb® 5 GU (from Omya) |
| DBU | 1,8-diazabicyclo[5.4.0]undec-7-ene |

Hydroxysilanes

Hydroxysilane 1:
N-(3-Triethoxysilylpropyl)-2-hydroxypropanamide

In a round-bottom flask, 20.00 g (90.4 mmol) of 3-aminopropyltriethoxysilane and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 2:
N-(3-Trimethoxysilylpropyl)-2-hydroxypropanamide

In a round-bottom flask, 16.21 g (90.4 mmol) of 3-aminopropyltrimethoxysilane and 6.71 g (46.6 mmol) of L-lactide were stirred under a nitrogen atmosphere at 80° C. for 3 h until no further progress in the reaction was detected by means of IR spectroscopy. The crude product was aftertreated at 60° C. and about 10 mbar for 15 min. A colorless liquid product was obtained.

Hydroxysilane 3: 2-Morpholino-4(5)-(2-triethoxysilylethyl)cyclohexan-1-ol

In a round-bottom flask, 38.46 g (133.33 mmol) of β-(3,4-epoxycyclohexyl)ethyltriethoxysilane (CoatOSil®

1770 from Momentive), 15.34 g (176.08 mmol) of anhydrous morpholine and 0.10 g of lanthanum(III) triflate were stirred under a nitrogen atmosphere at 110° C. for 2 h until no further progress in the reaction was detected by means of gas chromatography. The crude product was aftertreated at 80° C. and about 1 mbar for 30 min. A colorless liquid product was obtained.

Hydroxysilane 4: 2-Ethoxy-4(5)-(2-triethoxysilylethyl)cyclohexan-1-ol

In a round-bottom flask, 150.00 g of ethanol and 0.50 g of vinyltriethoxysilane were stirred under a nitrogen atmosphere at 50° C. for 15 min. Subsequently, 180.00 g (624 mmol) of β-(3,4-epoxycyclohexyl)ethyltriethoxysilane (CoatOSil® 1770, from Momentive) and 3.06 g of aluminum isopropoxide were added, and the mixture was stirred at reflux at 100° C. under a nitrogen atmosphere for 16 h. Then the cloudy reaction mixture was cooled down to room temperature and filtered, and excess ethanol was removed on a rotary evaporator at 80° C. and 10 mbar. A colorless liquid product was obtained.

Hydroxysilane 5: 2-Methoxy-4(5)-(2-trimethoxysilylethyl)cyclohexan-1-ol

In a round-bottom flask, 104.35 g of methanol and 0.39 g of vinyltrimethoxysilane were stirred under a nitrogen atmosphere at 50° C. for 15 min. Then 153.74 g (624 mmol) of β-(3,4-epoxycyclohexyl)ethyltrimethoxysilane (Silquest® A-186, from Momentive) and 3.06 g of aluminum isopropoxide were added and the cloudy mixture was reacted in 60 g portions in the microwave reactor, in each case at 140° C. and a pressure of about 12 bar for 30 min. Subsequently, the combined cloudy reaction mixtures were cooled down to room temperature and filtered, and excess methanol was removed on a rotary evaporator at 80° C. and 10 mbar. A colorless liquid product was obtained.

Hydroxysilane 6

Mixture comprising 2-(2-methoxyethoxy)ethoxy-4(5)-(2-tris(2-(2-methoxyethoxy)ethoxy)silylethyl)cyclohexan-1-ol, 2-(2-methoxyethoxy)ethoxy-4(5)-(2-ethoxybis(2-(2-methoxyethoxy)ethoxy)silylethyl)cyclohexan-1-ol and 2-(2-methoxyethoxy)ethoxy-4(5)-(2-diethoxy-(2-(2-methoxyethoxy)ethoxy)silylethyl)cyclohexan-1-ol In a round-bottom flask, 117.04 g of methyldiglycol, 50.00 g (203 mmol) of β-(3,4-epoxycyclohexyl)ethyltrimethoxysilane (Silquest® A-186, from Momentive) and 0.50 g of aluminum isopropoxide were stirred under a nitrogen atmosphere at 120° C. and for 1 h. Subsequently, at constant temperature, a clear distillate was collected via an uncooled distillation attachment at 400 mbar over 2 h, at 300 mbar over a further 2 h and at 150 mbar over a further 3 h, which was identified as almost pure methanol with traces of methyldiglycol by FT-IR. The reaction mixture was stirred at 140° C. and 50 mbar for 24 hours, until it was no longer possible to collect any more distillate. Finally, the excess methyldiglycol was removed at 120° C. and 0.5 mbar. A colorless liquid product was obtained.

Polyurethane Polymer Having Isocyanate Groups:
NCO polymer 1:
With exclusion of moisture, 720.0 g of Acclaim® 12200, 34.5 g of IPDI, 80.0 g of DIDP and 0.1 g of bismuth tris(neodecanoate) (10% by weight in DIDP) were heated to 90° C. while stirring constantly and left at this temperature until the content of free isocyanate groups, determined by titrimetry, had reached a stable value of 0.73% by weight. The polymer having isocyanate groups was cooled down to room temperature and stored with exclusion of moisture. It was clear and, the day after the preparation, had a viscosity of 31 Pa·s (20° C.).

Silane-Functional Polymers P1:
Polymer P1-1:
With exclusion of moisture, 100.00 g of NCO polymer 1, 0.06 g of bismuth tris(neodecanoate) (10% by weight in DIDP) and 7.19 g of diethyl N-(3-triethoxysilylpropyl)aspartate were stirred under a nitrogen atmosphere at 80° C. until no isocyanate groups were detectable any longer by means of IR spectroscopy (about 1.5 h). The silane-functional polymer was cooled down to room temperature and stored with exclusion of moisture. It was clear and, the day after the preparation, had a viscosity of 83 Pa·s (20° C.).

Polymer P1-2:
TEGOPAC® Bond 150 (from Evonik Industries) having a viscosity of 78 Pa·s (20° C.).

Polymer P1-3:
With exclusion of moisture, 250.00 g of Acclaim® 12200 and 0.25 g of vinyltriethoxysilane were stirred at 80° C. for 30 min and then 0.25 g of bismuth tris(neodecanoate) (10% by weight in DIDP) and 12.86 g of isocyanatopropyltriethoxysilane were added and the reaction mixture was stirred at 80° C. under reduced pressure for 2 h. Subsequently, 3.00 g of ethanol were added and the mixture was stirred without reduced pressure for 15 minutes, then under reduced pressure for a further 15 minutes. No isocyanate band was detected any longer in the FT-IR. The silane-functional polymer was cooled down to room temperature and stored with exclusion of moisture. It was clear and, the day after the preparation, had a viscosity of 10 Pa·s.

Polymer P1-4:
With exclusion of moisture, 100.00 g of NCO polymer 1, 0.06 g of bismuth tris(neodecanoate) (10% by weight in DIDP) and 7.54 g of hydroxysilane 3 were stirred under a nitrogen atmosphere at 80° C. until no isocyanate groups were detectable any longer by means of IR spectroscopy (about 2 hours). The silane-functional polymer was cooled down to room temperature and stored with exclusion of moisture. It was clear and, the day after the preparation, had a viscosity of 98 Pa·s (20° C.).

Polymer P1-5:
With exclusion of moisture, 100.00 g of NCO polymer 1, 0.06 g of bismuth tris(neodecanoate) (10% by weight in DIDP) and 6.72 g of hydroxysilane 4 were stirred under a nitrogen atmosphere at 80° C. until no isocyanate groups were detectable any longer by means of IR spectroscopy (about 2 hours). The silane-functional polymer was cooled down to room temperature and stored with exclusion of moisture. It was clear and, the day after the preparation, had a viscosity of 116 Pa·s (20° C.).

Polymer P1-6:
With exclusion of moisture, 100.00 g of NCO polymer 1, 0.06 g of bismuth tris(neodecanoate) (10% by weight in DIDP) and 12.66 g of hydroxysilane 6 were stirred under a nitrogen atmosphere at 80° C. until no isocyanate groups were detectable any longer by means of IR spectroscopy (about 2 hours). The silane-functional polymer was cooled down to room temperature and stored with exclusion of moisture. It was clear and, the day after the preparation, had a viscosity of 126 Pa·s (20° C.).

Polymer P1-7: TEGOPAC® Bond 250 (from Evonik Industries) having a viscosity of 50 Pa·s (20° C.).

Polymer P1-8: TEGOPAC® Seal 100 (from Evonik Industries) having a viscosity of 40 Pa·s (20° C.).

Polymer P1-9:

With exclusion of moisture, 100.00 g of NCO polymer 1, 0.06 g of bismuth tris(neodecanoate) (10% by weight in DIDP) and 6.42 g of diethyl N-(3-trimethoxysilylpropyl) aspartate were stirred under a nitrogen atmosphere at 80° C. until no isocyanate groups were detectable any longer by means of IR spectroscopy (about 1.5 h). The silane-functional polymer was cooled down to room temperature and stored with exclusion of moisture. It was clear and, the day after the preparation, had a viscosity of 143 Pa·s (20° C.).

Polymer P1-10: MS Polymer™ S203H (from Kaneka) having a viscosity of 11 Pa·s (20° C.).

Polymer P1-11: Silyl™ MAX602 (from Kaneka) having a viscosity of 83 Pa·s (20° C.).

Polymer P1-12: MS Polymer™ XMAP SA100S (from Kaneka) having a viscosity of 431 Pa·s (20° C.).

Polymer P1-13:

With exclusion of moisture, 250.00 g of Acclaim® 12200 and 0.25 g of vinyltrimethoxysilane were stirred at 80° C. for 30 min and then 0.25 g of bismuth tris(neodecanoate) (10% by weight in DIDP) and 10.67 g of isocyanatopropyltrimethoxysilane were added and the reaction mixture was stirred at 80° C. under reduced pressure for 2 h. Subsequently, 2.10 g of methanol were added and the mixture was stirred without reduced pressure for 15 minutes, then under reduced pressure for a further 15 minutes. No isocyanate band was detected any longer in the FT-IR. The silane-functional polymer was cooled down to room temperature and stored with exclusion of moisture. It was clear and, the day after the preparation, had a viscosity of 11 Pa·s.

Polymer P1-14:

With exclusion of moisture, 100.00 g of NCO polymer 1, 0.06 g of bismuth tris(neodecanoate) (10% by weight in DIDP) and 5.58 g of hydroxysilane 5 were stirred under a nitrogen atmosphere at 80° C. until no isocyanate groups were detectable any longer by means of IR spectroscopy (about 2 hours). The silane-functional polymer was cooled down to room temperature and stored with exclusion of moisture. It was clear and, the day after the preparation, had a viscosity of 91 Pa·s (20° C.).

Polymer P1-15:

With exclusion of moisture, 333.30 g of NCO polymer 1, 0.25 g of Coscat® 83 (Bi(III) neodecanoate, from Vertellus) and 13.09 g of N-(3-triethoxysilylpropyl)formamide (prepared as described in WO 2015/113923 example 3) were stirred at 80° C. under a nitrogen atmosphere until no isocyanate groups were detectable any longer by means of IR spectroscopy (about 3 h). The silane-functional polymer was cooled down to room temperature and stored with exclusion of moisture. It was clear and, the day after the preparation, had a viscosity of 203 Pa·s (20° C.).

Polymer P1-16:

Polyvest® EP ST-E (from Evonik Industries), triethoxysilane-terminated polybutadiene having a viscosity of 11 Pa·s (20° C.).

Silane-Functional Polymers P2 Having End Groups of the Formula (I):

Polymer P2-1:

With exclusion of moisture, 100.00 g of NCO polymer 1, 0.06 g of bismuth tris(neodecanoate) (10% by weight in DIDP) and 5.88 g of hydroxysilane 1 were stirred under a nitrogen atmosphere at 80° C. until no isocyanate groups were detectable any longer by means of IR spectroscopy (about 2 hours). The silane-functional polymer was cooled down to room temperature and stored with exclusion of moisture. It was clear and, the day after the preparation, had a viscosity of 88 Pa·s (20° C.).

Polymer P2-2:

With exclusion of moisture, 250.00 g of Acclaim® 12200 and 0.25 g of vinyltriethoxysilane were stirred under reduced pressure at 80° C. for 30 min. Subsequently, 0.25 g of bismuth tris(neodecanoate) (10% by weight in DIDP) and 9.06 g of TDI were added and the mixture was stirred at 80° C. without reduced pressure for 1 h, then at 80° C. under reduced pressure for 1 h. Subsequently, 17.32 g of hydroxysilane 1 were added and the mixture was stirred at 80° C. under reduced pressure for 90 min until no isocyanate groups were detectable any longer by means of IR spectroscopy. The silane-functional polymer was cooled down to room temperature and stored with exclusion of moisture. It was clear and, the day after the preparation, had a viscosity of 85.2 Pa·s (20° C.).

Polymer P2-3:

With exclusion of moisture, 100.00 g of NCO polymer 1, 0.06 g of bismuth tris(neodecanoate) (10% by weight in DIDP) and 4.86 g of hydroxysilane 2 were stirred under a nitrogen atmosphere at 80° C. until no isocyanate groups were detectable any longer by means of IR spectroscopy (about 2 hours). The silane-functional polymer was cooled down to room temperature and stored with exclusion of moisture. It was clear and, the day after the preparation, had a viscosity of 158 Pa·s (20° C.).

Preparation of a Silane-Functional Polymer P2 in a Silane-Functional Polymer P1:

Polymer P12-1:

With exclusion of moisture, 146.20 g of polymer P1-2 (TEGOPAC® Bond 150, from Evonik Industries) were initially charged and stirred under reduced pressure at 100° C. for 5 min. Then 5.45 g (24.6 mmol) of 3-aminopropyltriethoxysilane and subsequently 1.81 g (12.6 mmol) of L-lactide were mixed in and the mixture was stirred at 110° C. for 1 h. Subsequently, 140.00 g of NCO polymer 1 and 0.30 g of bismuth tris(neodecanoate) (10% by weight in DIDP) were added and the reaction mixture was stirred at 100° C. under reduced pressure for 1 h. No isocyanate band was detected any longer in the FT-IR. The silane-functional polymer was cooled down to room temperature and stored with exclusion of moisture. It was clear and, the day after the preparation, had a viscosity of 93 Pa·s (20° C.).

Polymer P12-2:

With exclusion of moisture, 146.20 g of MS Polymer™ S303H (from Kaneka) were initially charged and stirred under reduced pressure at 100° C. for 5 min. Then 4.42 g (24.6 mmol) of 3-aminopropyltrimethoxysilane and subsequently 1.81 g (12.6 mmol) of L-lactide were mixed in and the mixture was stirred at 100° C. for 1 h. Subsequently, 140.00 g of NCO polymer 1 and 0.30 g of bismuth tris (neodecanoate) (10% by weight in DIDP) were added and the reaction mixture was stirred at 100° C. under reduced pressure for 1 h. No isocyanate band was detected any longer in the FT-IR. The silane-functional polymer was cooled down to room temperature and stored with exclusion of moisture. It was clear and, the day after the preparation, had a viscosity of 62 Pa·s (20° C.).

2. Moisture-Curing Compositions (Unfilled)

Compositions Z1 to Z28:

For each composition, the ingredients specified in table 1 were processed in the amounts specified (in parts by weight) in a vacuum mixer at 50° C. with exclusion of moisture for 30 min to give a homogeneous paste, and stored.

Each composition was tested as follows:

The viscosity was determined the day after the preparation with a Rheotec RC30 thermostatted cone-plate viscometer (cone diameter 50 mm, cone angle 1°, cone tip-plate distance 0.05 mm, shear rate 10 s$^{-1}$) at a temperature of 20° C.

To determine the tack-free time (TFT), a few grams of the composition were applied to cardboard in a layer thickness of about 2 mm and, under standard climatic conditions, the time until, when the surface of the composition was tapped gently by means of an LDPE pipette, there were for the first time no remaining residues on the pipette was determined.

TABLE 1

Composition and properties of the compositions Z1 to Z28.

| Composition | Z1 (Ref.) | Z2 | Z3 | Z4 | Z5 | Z6 | Z7 (Ref.) |
|---|---|---|---|---|---|---|---|
| Polymer P1-1 | 10.0 | 9.0 | 8.0 | 7.0 | 5.0 | 3.0 | — |
| Polymer P2-1 | — | 1.0 | 2.0 | 3.0 | 5.0 | 7.0 | 10.0 |
| IBAY | 0.4 | 0.4 | 0.4 | 0.4 | 0.4 | 0.4 | 0.4 |
| TFT [min.] | 190 | 115 | 82 | 63 | 50 | 49 | 51 |
| Viscosity [Pa·s] | 58.4 | 60.0 | 62.8 | 64.8 | 67.6 | 74.1 | 82.1 |

| Composition | Z8 (Ref.) | Z9 | Z10 | Z11 | Z12 | Z13 | Z14 (Ref.) |
|---|---|---|---|---|---|---|---|
| Polymer P1-2 | 10.0 | 9.0 | 8.0 | 7.0 | 5.0 | 3.0 | — |
| Polymer P2-1 | — | 1.0 | 2.0 | 3.0 | 5.0 | 7.0 | 10.0 |
| IBAY | 0.4 | 0.4 | 0.4 | 0.4 | 0.4 | 0.4 | 0.4 |
| TFT [min.] | 70 | 60 | 55 | 52 | 49 | 48 | 51 |
| Viscosity [Pa·s] | 68.7 | 69.4 | 70.0 | 71.8 | 74.0 | 77.2 | 82.1 |

| Composition | Z15 (Ref.) | Z16 | Z17 | Z18 | Z19 | Z20 | Z21 (Ref.) |
|---|---|---|---|---|---|---|---|
| Polymer P1-9 | 10.0 | 9.0 | 8.0 | 7.0 | 5.0 | 3.0 | — |
| Polymer P2-3 | — | 1.0 | 2.0 | 3.0 | 5.0 | 7.0 | 10.0 |
| IBAY | 0.2 | 0.2 | 0.2 | 0.2 | 0.2 | 0.2 | 0.2 |
| TFT [min.] | 45 | 29 | 22 | 17 | 13 | 12 | 12 |
| Viscosity [Pa·s] | 60.2 | 63.6 | 70.8 | 78.4 | 102.6 | 123.6 | 148.5 |

TABLE 1-continued

Composition and properties of the compositions Z1 to Z28.

| Composition | Z22 (Ref.) | Z23 | Z24 | Z25 | Z26 | Z27 | Z28 (Ref.) |
|---|---|---|---|---|---|---|---|
| Polymer P1-10 | 10.0 | 9.0 | 8.0 | 7.0 | 5.0 | 3.0 | — |
| Polymer P2-3 | — | 1.0 | 2.0 | 3.0 | 5.0 | 7.0 | 10.0 |
| IBAY | 0.2 | 0.2 | 0.2 | 0.2 | 0.2 | 0.2 | 0.2 |
| TFT [min.] | 75 | 50 | 23 | 14 | 11 | 11 | 12 |
| Viscosity [Pa·s] | 15.8 | 21.1 | 29.8 | 37.3 | 64.3 | 94.0 | 148.5 |

3. Moisture-Curing Compositions (Filled)

Compositions Z29 to Z73

For each composition, the ingredients specified in tables 2 to 4 were processed in the amounts specified (in parts by weight) in a vacuum mixer at 50° C. with exclusion of moisture for 30 min to give a homogeneous paste, and stored. Each composition was tested as follows:

Viscosity and tack-free time were tested as described for composition Z1. Shore A hardness was determined in accordance with DIN 53505 on test specimens which had been cured under standard climatic conditions for 14 days.

To determine the mechanical properties, the composition was applied to a PTFE-coated film to give a film of thickness 2 mm, which was stored under standard climatic conditions for 2 weeks, and some dumbbells having a length of 75 mm with a bar length of 30 mm and a bar width of 4 mm were punched out of the film and these were tested in accordance with DIN EN 53504 at a pulling speed of 200 mm/min for tensile strength (breaking force), elongation at break and modulus of elasticity (modulus of elasticity at 0.5%-5% elongation).

The results are reported in tables 2 to 4.

The thickener paste was produced by initially charging a vacuum mixer with 300 g of diisodecyl phthalate and 48 g of 4,4'-methylene diphenyl diisocyanate (Desmodur® 44 MC L; from Bayer), heating them gently and then, while stirring vigorously, gradually adding 27 g of monobutylamine dropwise. The resultant paste was stirred for a further hour under vacuum and while cooling.

TABLE 2

Composition and properties of the compositions Z29 to Z51.

| Composition | Z29 (Ref.) | Z30 | Z31 (Ref.) | Z32 | Z33 | Z34 | Z35 (Ref.) | Z36 (Ref.) |
|---|---|---|---|---|---|---|---|---|
| Polymer P1 | P1-1 20.0 | P1-1 10.0 | P1-2 20.0 | P1-2 15.0 | P1-2 10.0 | P12-1 20.0 | P1-1 10.0 P1-2 10.0 | P1-2 20.0 |
| Polymer P2 | — | P2-1 10.0 | — | P2-1 5.0 | P2-1 10.0 | — | — | — |
| DIDP | 17.6 | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 | 5.9 |
| VTEO | 1.0 | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 | 50.0 |
| IBAY | 1.6 | 1.6 | 1.6 | 1.6 | 1.6 | 1.6 | 1.6 | 1.6 |
| Hydroxysilane 1 | — | — | — | — | — | — | — | 1.0 |
| DBU | — | — | — | — | — | — | — | — |
| Viscosity [Pa·s] | 66.9 | 69.7 | 63.2 | 71.8 | 86.4 | 60.5 | 68.8 | 69.3 |
| TFT [min.] | >300 | 100 | 260 | 150 | 55 | 70 | 280 | >3 d |
| Shore A | 20 | 29 | 16 | 20 | 33 | 26 | 23 | n.d. |
| Tensile strength [MPa] | 1.1 | 1.2 | 0.5 | 0.8 | 1.1 | 0.8 | 0.9 | n.d. |
| Elongation at break [%] | 165 | 158 | 67 | 98 | 119 | 110 | 115 | n.d. |
| Modulus of elasticity [MPa] | 0.9 | 1.1 | 0.8 | 0.6 | 1.1 | 0.7 | 0.9 | n.d. |

TABLE 2-continued

Composition and properties of the compositions Z29 to Z51.

| Composition | Z37 (Ref.) | Z38 | Z39 | Z40 (Ref.) | Z41 | Z42 (Ref.) | Z43 (Ref.) | Z44 |
|---|---|---|---|---|---|---|---|---|
| Polymer P1 | P1-3 | P1-3 | P1-3 | P1-4 | P1-4 | P1-5 | P1-5 | P1-5 |
|  | 20.0 | 10.0 | 10.0 | 20.0 | 10.0 | 20.0 | 20.0 | 10.0 |
| Polymer P2 | — | P2-1 | P2-2 | — | P2-1 | — | — | P2-1 |
|  |  | 10.0 | 10.0 |  | 10.0 |  |  | 10.0 |
| DIDP | 17.6 | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 | 5.9 |
| VTEO | 1.0 | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 | 50.0 |
| IBAY | 1.6 | 1.6 | 1.6 | 1.6 | 1.6 | 1.6 | 1.6 | 1.6 |
| Hydroxysilane 1 | — | — | — | — | — | — | — | — |
| DBU | — | — | — | — | — | — | 0.20 | — |
| Viscosity [Pa·s] | 38.1 | 43.5 | 42.9 | 90.0 | 80.1 | 93.4 | 66.6 | 81.1 |
| TFT [min.] | 150 | 90 | 70 | 200 | 100 | >360 | 270 | 85 |
| Shore A | 39 | 39 | 46 | 31 | 33 | 24 | 15 | 31 |
| Tensile strength [MPa] | 1.1 | 1.1 | 1.3 | 1.2 | 1.3 | 0.9 | 0.3 | 1.2 |
| Elongation at break [%] | 171 | 165 | 126 | 148 | 147 | 155 | 107 | 150 |
| Modulus of elasticity [MPa] | 1.3 | 1.2 | 1.4 | 1.2 | 1.4 | 0.9 | 0.4 | 1.3 |

| Composition | Z45 (Ref.) | Z46 (Ref.) | Z47 | Z48 | Z49 | Z50 (Ref.) | Z51 (Ref.) |
|---|---|---|---|---|---|---|---|
| Polymer P1 | P1-6 | P1-6 | P1-6 | P1-7 | P1-8 | — | — |
|  | 20.0 | 20.0 | 10.0 | 10.0 | 10.0 |  |  |
| Polymer P2 | — | — | P2-1 | P2-1 | P2-1 | P2-1 | P2-2 |
|  |  |  | 10.0 | 10.0 | 10.0 | 20.0 | 20.0 |
| DIDP | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 |
| VTEO | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 |
| IBAY | 1.6 | 1.6 | 1.6 | 1.6 | 1.6 | 1.6 | 1.6 |
| Hydroxysilane 1 | — | — | — | — | — | — | — |
| DBU | — | 0.20 | — | — | — | — | — |
| Viscosity [Pa·s] | 74.1 | 56.7 | 59.4 | 69.9 | 71.7 | 76.0 | 69.4 |
| TFT [min.] | >360 | 180 | 85 | 55 | 70 | 50 | 75 |
| Shore A | 11 | 9 | 26 | 30 | 28 | 37 | 45 |
| Tensile strength [MPa] | 0.3 | 0.3 | 1.0 | 0.9 | 0.9 | 1.4 | 1.5 |
| Elongation at break [%] | 73 | 90 | 120 | 110 | 111 | 174 | 138 |
| Modulus of elasticity [MPa] | 0.5 | 0.4 | 0.8 | 1.0 | 0.9 | 1.5 | 1.8 |

"n.d." stands for "not determined" (not cured).

TABLE 3

Composition and properties of the compositions Z52 to Z69.

| Composition | Z52 (Ref.) | Z53 | Z54 (Ref.) | Z55 | Z56 | Z57 (Ref.) | Z58 (Ref.) | Z59 (Ref.) | Z60 |
|---|---|---|---|---|---|---|---|---|---|
| Polymer P1 | P1-9 | P1-9 | P1-10 | P1-10 | P1-10 | P1-9 | P1-10 | P1-11 | P1-11 |
|  | 20.0 | 10.0 | 20.0 | 15.0 | 10.0 | 10.0 | 20.0 | 20.0 | 10.0 |
|  |  |  |  |  | P1-10 |  |  |  |  |
|  |  |  |  |  | 10.0 |  |  |  |  |
| Polymer P2 | — | P2-3 | — | P2-3 | P2-3 | — | — | — | P2-3 |
|  |  | 10.0 |  | 5.0 | 10.0 |  |  |  | 10.0 |
| DIDP | 17.6 | 17.6 | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 | 5.9 | 5.9 |
| VTMO | 1.0 | 1.0 | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 | 50.0 | 50.0 |
| IBAY | 1.0 | 1.0 | 1.0 | 1.0 | 1.0 | 1.0 | 1.0 | 1.0 | 1.0 |
| Hydroxysilane 2 | — | — | — | — | — | — | 1.0 | — | — |
| DBU | — | — | — | — | — | — | — | — | — |
| Viscosity [Pa·s] | 68.7 | 86.4 | 48.2 | 50.3 | 63.8 | 47.6 | 42.4 | 52.7 | 63.6 |
| TFT [min.] | 70 | 15 | 190 | 30 | 15 | 90 | >3 d | 360 | 20 |

TABLE 3-continued

Composition and properties of the compositions Z52 to Z69.

| | | | | | | | | | |
|---|---|---|---|---|---|---|---|---|---|
| Shore A | 33 | 30 | 16 | 19 | 22 | 24 | n.d. | 25 | 25 |
| Tensile strength [MPa] | 1.2 | 1.2 | 0.5 | 0.7 | 0.7 | 1.0 | n.d. | 0.9 | 0.9 |
| Elongation at break [%] | 195 | 205 | 133 | 162 | 140 | 197 | n.d. | 136 | 144 |
| Modulus of elasticity [MPa] | 1.4 | 1.1 | 0.6 | 0.7 | 0.6 | 0.9 | n.d. | 0.7 | 0.6 |

| Composition | Z61 (Ref.) | Z62 | Z63 (Ref.) | Z64 | Z65 (Ref.) | Z66 (Ref.) | Z67 | Z68 | Z69 (Ref.) |
|---|---|---|---|---|---|---|---|---|---|
| Polymer P1 | P1-12 | P1-12 | P1-13 | P1-13 | P1-14 | P1-14 | P1-14 | P12-2 | — |
|  | 20.0 | 10.0 | 20.0 | 10.0 | 20.0 | 20.0 | 10.0 | 20.0 |  |
| Polymer P2 | — | P2-3 | — | P2-3 | — | — | P2-3 | — | P2-3 |
|  |  | 10.0 |  | 10.0 |  |  | 10.0 |  | 20.0 |
| DIDP | 17.6 | 17.6 | 17.6 | 17.6 | 17.6 | 17.6 | 17.6 | 17.6 | 17.6 |
| Thickener paste | 5.9 | 5.9 | 5.9 | 5.9 | 5.9 | 5.9 | 5.9 | 5.9 | 5.9 |
| VTMO | 1.0 | 1.0 | 1.0 | 1.0 | 1.0 | 1.0 | 1.0 | 1.0 | 1.0 |
| PCC | 10.0 | 10.0 | 10.0 | 10.0 | 10.0 | 10.0 | 10.0 | 10.0 | 10.0 |
| GCC | 50.0 | 50.0 | 50.0 | 50.0 | 50.0 | 50.0 | 50.0 | 50.0 | 50.0 |
| IBAY | 1.0 | 1.0 | 1.0 | 1.0 | 1.0 | 1.0 | 1.0 | 1.0 | 1.0 |
| Hydroxysilane 2 | — | — | — | — | — | — | — | — | — |
| DBU | — | — | — | — | — | 0.2 | — | — | — |
| Viscosity [Pa · s] | 89.8 | 70.3 | 39.1 | 54.0 | 71.0 | 78.9 | 85.4 | 64.2 | 107.1 |
| TFT [min.] | 120 | 15 | 20 | 15 | 65 | 15 | 20 | 25 | 10 |
| Shore A | 23 | 25 | 40 | 34 | 23 | 20 | 26 | 24 | 26 |
| Tensile strength [MPa] | 0.6 | 0.7 | 1.2 | 1.1 | 0.9 | 0.7 | 0.9 | 0.8 | 1.0 |
| Elongation at break [%] | 64 | 88 | 192 | 158 | 202 | 202 | 185 | 174 | 170 |
| Modulus of elasticity [MPa] | 0.8 | 0.7 | 1.4 | 0.9 | 0.5 | 0.5 | 0.6 | 0.6 | 0.8 |

"n.d." stands for "not determined" (not cured).

TABLE 4

Composition and properties of the compositions Z70 to Z73.

| Composition | Z70 (Ref.) | Z71 | Z72 (Ref.) | Z73 |
|---|---|---|---|---|
| Polymer P1 | P1-15 | P1-15 | P1-17 | P1-17 |
|  | 20.0 | 10.0 | 20.0 | 10.0 |
| Polymer P2 | — | P2-1 | — | P2-1 |
|  |  | 10.0 |  | 10.0 |
| DIDP | 17.6 | 17.6 | 17.6 | 17.6 |
| Thickener paste | 5.9 | 5.9 | 5.9 | 5.9 |
| VTEO | 1.0 | 1.0 | 1.0 | 1.0 |
| PCC | 10.0 | 10.0 | 10.0 | 10.0 |
| GCC | 50.0 | 50.0 | 50.0 | 50.0 |
| IBAY | 1.6 | 1.6 | 1.6 | 1.6 |
| Viscosity [Pa · s] | 73.5 | 74.1 | 33.3 | 54.2 |
| TFT [min.] | 190 | 40 | 27 | 27 |
| Shore A | n.m.[1] | 20 | 68 | 58 |
| Tensile strength [MPa] | n.m.[1] | 0.9 | 2.2 | 1.7 |
| Elongation at break [%] | n.m.[1] | 157 | 59 | 67 |
| Modulus of elasticity [MPa] | n.m.[1] | 0.5 | 5.9 | 2.8 |

[1] not measurable (too soft)

The invention claimed is:

1. A composition comprising
   at least one silane-functional polymer P1; and
   at least one silane-functional polymer P2 having end groups of the formula (I)

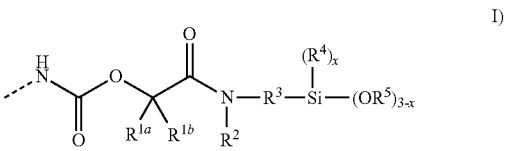

where $R^{1a}$ and $R^{1b}$ are each independently a hydrogen atom or a monovalent hydrocarbyl radical having 1 to 12 carbon atoms, or together are an alkylene radical having 2 to 6 carbon atoms, $R^2$ is a hydrogen atom or a monovalent hydrocarbyl radical which has 1 to 12 carbon atoms and optionally contains ether groups, ester groups, nitrile groups, amino groups or silane groups, R³ is a linear or branched alkylene or cycloalkylene radical having 1 to 20 carbon atoms, optionally having aromatic components, and optionally having one or more heteroatoms, especially nitrogen atoms, R⁴ is an alkyl radical having 1 to 8 carbon atoms, R⁵ is an alkyl radical which has 1 to 10 carbon atoms and optionally contains ether groups, and x is 0, 1 or 2, where the weight ratio between the silane-functional polymer P1 and the silane-functional polymer P2 is in the range from 99:1 to 10:90, and where the silane-functional polymer P1 does not have any end groups of the formula (I).

2. The composition as claimed in claim 1, wherein the silane-functional polymer P1 is a polyether containing silane groups.

3. The composition as claimed in claim 2, wherein the silane-functional polymer P1 is selected from the group consisting of polyethers containing silane groups that have been obtained from the reaction of polyethers containing allyl groups with hydrosilanes, optionally with chain extension;

polyethers containing silane groups that have been obtained from the copolymerization of alkylene oxides and epoxysilanes, optionally with chain extension;

polyethers containing silane groups that have been obtained from the reaction of polyether polyols with isocyanatosilanes, optionally with chain extension with diisocyanates; and polyethers containing silane groups that have been obtained from the reaction of urethane polyethers containing isocyanate groups with aminosilanes or hydroxysilanes or mercaptosilanes.

4. The composition as claimed in claim 3, wherein the silane-functional polymer P1 is either a polyether containing silane groups that has been obtained from the reaction of polyethers containing allyl groups with hydrosilanes or a polyether containing silane groups that has been obtained from the reaction of polyether polyols with isocyanatosilanes.

5. The composition as claimed in claim 1, wherein the silane-functional polymer P2 is a polyether and/or polyester and/or polycarbonate containing silane groups.

6. The composition as claimed in claim 1, wherein $R^{1a}$ is a methyl radical and $R^{1b}$ is a hydrogen atom.

7. The composition as claimed in claim 1, wherein $R^{1a}$ is a methyl radical, $R^{1b}$ is a hydrogen atom, $R^2$ is a hydrogen atom, $R^3$ is a radical selected from the group consisting of 1,3-propylene, 2-methyl-1,3-propylene, 1,4-butylene, 3-methyl-1,4-butylene and 3,3-dimethyl-1,4-butylene, $R^5$ is a methyl radical or an ethyl radical and x is 0.

8. The composition as claimed in claim 1, wherein the weight ratio between the silane-functional polymer P1 and the silane-functional polymer P2 is in the range from 98:2 to 20:80.

9. The composition as claimed in claim 1, wherein the silane-functional polymer P1 and the silane-functional polymer P2 both contain either exclusively methoxysilane groups or exclusively ethoxysilane groups.

10. The composition as claimed in claim 1, wherein it comprises at least one further constituent selected from fillers, crosslinkers, plasticizers, solvents, catalysts, adhesion promoters, desiccants, stabilizers, pigments and rheology aids.

11. The composition as claimed in claim 10, wherein it has a content of silane-functional polymers in the range from 5% to 95% by weight.

12. The composition as claimed in claim 1, wherein it is free of heavy metal-containing organic compounds.

13. A cured composition obtained from a composition as claimed in claim 1 after it has reacted with moisture.

14. A method comprising applying a composition as claimed in claim 1 as an adhesive or sealant or as a coating.

15. A method of accelerating curing of a moisture-curing composition comprising at least one silane-functional polymer P1, by adding to the composition at least one silane-functional polymer P2 having end groups of the formula (I)

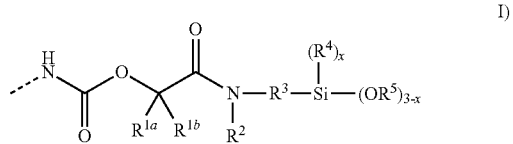

where $R^{1a}$ and $R^{1b}$ are each independently a hydrogen atom or a monovalent hydrocarbyl radical having 1 to 12 carbon atoms, or together are an alkylene radical having 2 to 6 carbon atoms, $R^2$ is a hydrogen atom or a monovalent hydrocarbyl radical which has 1 to 12 carbon atoms and optionally contains ether groups, ester groups, nitrile groups, amino groups or silane groups, $R^3$ is a linear or branched alkylene or cycloalkylene radical having 1 to 20 carbon atoms, optionally having aromatic components, and optionally having one or more heteroatoms, especially nitrogen atoms, $R^4$ is an alkyl radical having 1 to 8 carbon atoms, $R^5$ is an alkyl radical which has 1 to 10 carbon atoms and optionally contains ether groups, and x is 0, 1 or 2;

where the silane-functional polymer P1 does not have any end groups of the formula (I).

* * * * *